US012561129B2

(12) United States Patent
McNamara

(10) Patent No.: US 12,561,129 B2
(45) Date of Patent: Feb. 24, 2026

(54) SYSTEMS AND METHODS FOR PROVIDING A DATA STRUCTURE THAT STORES INFORMATION ASSOCIATED WITH SERVERLESS COMPUTE FILE PACKAGES

(71) Applicant: Capital One Services, LLC, McLean, VA (US)

(72) Inventor: Brian Michael McNamara, Frenchtown, NJ (US)

(73) Assignee: Capital One Services, LLC, McLean, VA (US)

( * ) Notice: Subject to any disclaimer, the term of this patent is extended or adjusted under 35 U.S.C. 154(b) by 193 days.

(21) Appl. No.: 18/508,054

(22) Filed: Nov. 13, 2023

(65) Prior Publication Data

US 2025/0156171 A1 May 15, 2025

(51) Int. Cl.
*G06F 8/65* (2018.01)

(52) U.S. Cl.
CPC ..................................... *G06F 8/65* (2013.01)

(58) Field of Classification Search
None
See application file for complete search history.

(56) References Cited

U.S. PATENT DOCUMENTS

| | | | | |
|---|---|---|---|---|
| 11,392,422 B1 * | 7/2022 | Filiz | ................... | G06F 9/45558 |
| 12,061,928 B1 * | 8/2024 | Anjanappa | ............ | G06F 9/4887 |
| 12,367,027 B2 * | 7/2025 | Wang | ........................ | G06F 8/65 |
| 2017/0076548 A1 * | 3/2017 | Washington | .......... | A63F 13/837 |
| 2017/0308822 A1 * | 10/2017 | Prismon | ................... | G06F 8/60 |
| 2019/0079750 A1 * | 3/2019 | Foskett | ................. | G06F 9/5072 |
| 2019/0332483 A1 * | 10/2019 | Natanzon | ............ | G06F 11/1448 |
| 2021/0042104 A1 * | 2/2021 | Tashkandi | ........... | G06F 11/3688 |
| 2021/0110506 A1 * | 4/2021 | Prakash | .................. | G06F 9/505 |
| 2021/0342329 A1 * | 11/2021 | Padmanabhan | ......... | G06F 16/28 |
| 2023/0102541 A1 * | 3/2023 | Vohra | ...................... | G06N 3/063 711/163 |
| 2023/0168875 A1 * | 6/2023 | Carter | ....................... | G06F 8/71 717/174 |
| 2023/0325179 A1 * | 10/2023 | Griffin | ................ | G06F 11/3466 717/120 |
| 2023/0388180 A1 * | 11/2023 | Ayyagari | .................. | G06F 8/34 |
| 2024/0111601 A1 * | 4/2024 | Mei | ......................... | G06F 8/433 |

FOREIGN PATENT DOCUMENTS

| | | | | | |
|---|---|---|---|---|---|
| CN | 113064600 | A | * | 7/2021 | ............. G06F 8/63 |
| KR | 20090044350 | A | * | 5/2009 | ............. H04M 1/24 |

* cited by examiner

*Primary Examiner* — Philip Wang
(74) *Attorney, Agent, or Firm* — Harrity & Harrity, LLP

(57) ABSTRACT

In some implementations, a system may cause a serverless compute file package to be included in a serverless compute environment. The system may process the serverless compute file package to determine information associated with the serverless compute file package. The system may cause the information associated with the serverless compute file package to be deployed in the data structure, wherein the information associated with the serverless compute file package indicates at least one serverless compute service that is associated with the serverless compute file package and the serverless compute environment.

20 Claims, 9 Drawing Sheets

Figure 1A:
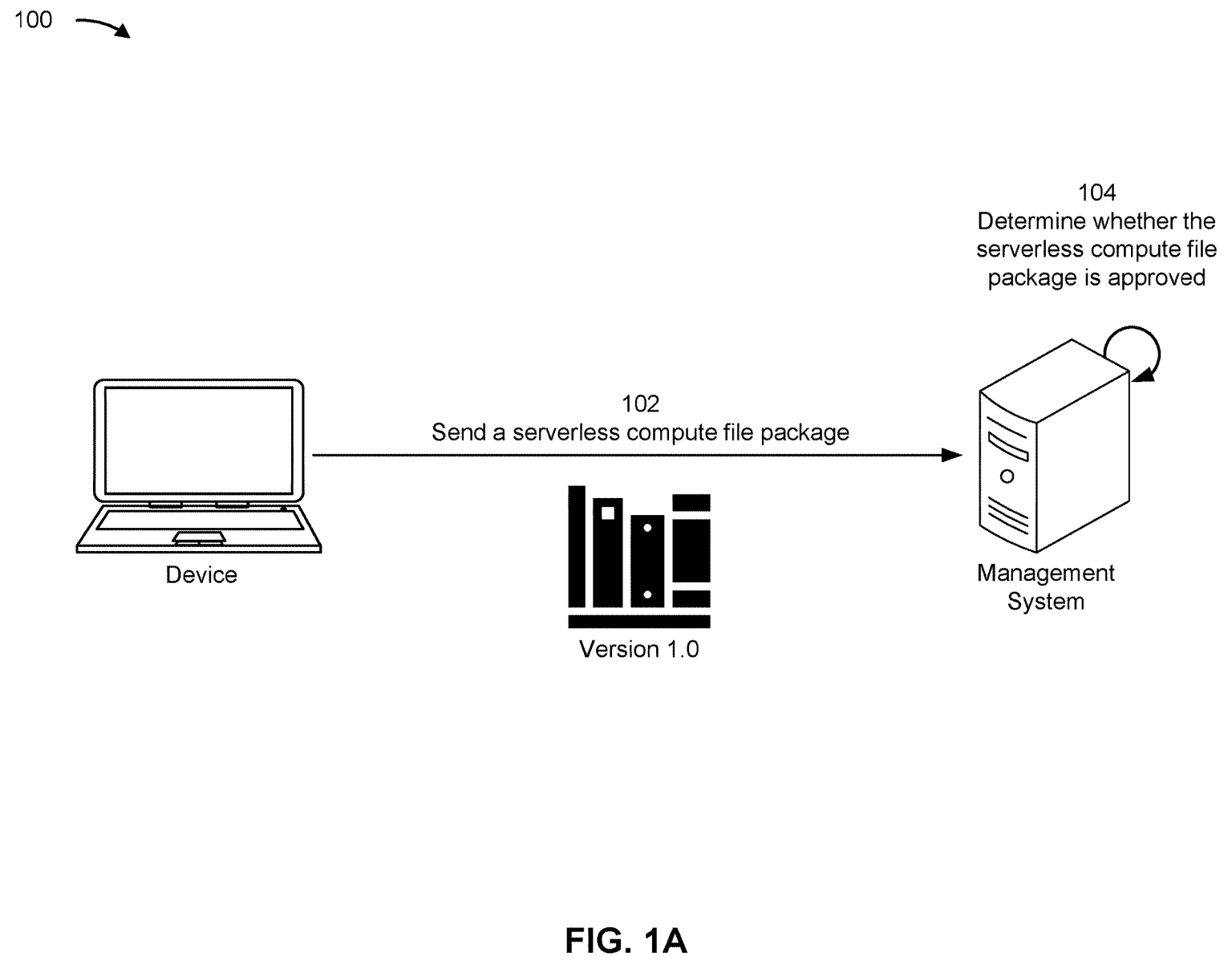

104
Determine whether the
serverless compute file
package is approved

Management
System

102
Send a serverless compute file package

Version 1.0

Device

Device

112
Send a query

116
Send a message

114
Identify the information associated with the serverless compute file package Management System Information Data Structure

100

118
Send an updated version of the serverless compute file package

120
Determine whether the updated version of the serverless compute file package is approved Device Version 1.1

Management System

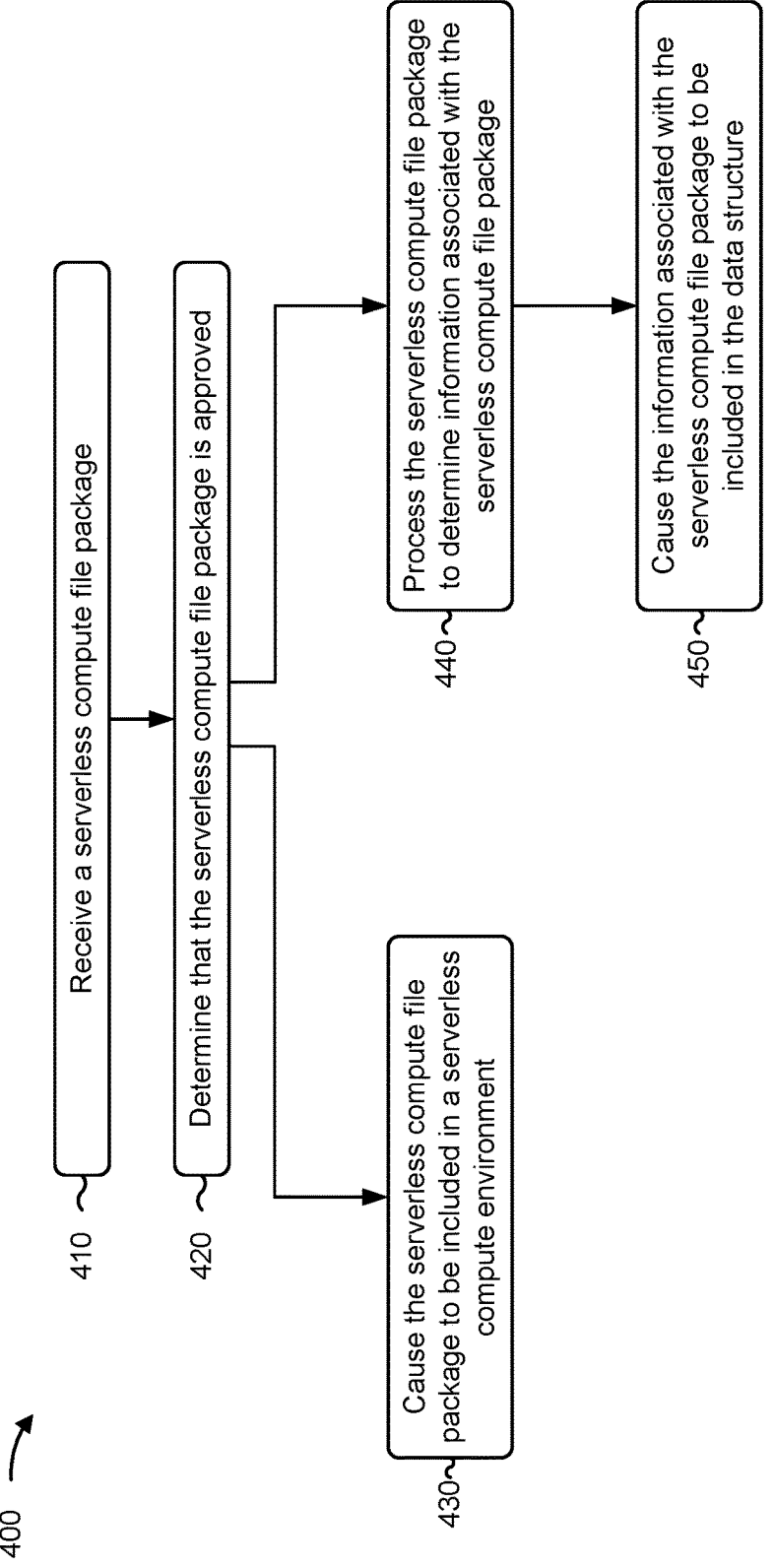

400

410 — Receive a serverless compute file package

420 — Determine that the serverless compute file package is approved

430 — Cause the serverless compute file package to be included in a serverless compute environment 440 — Process the serverless compute file package to determine information associated with the serverless compute file package 450 — Cause the information associated with the serverless compute file package to be included in the data structure

FIG. 4

SYSTEMS AND METHODS FOR PROVIDING A DATA STRUCTURE THAT STORES INFORMATION ASSOCIATED WITH SERVERLESS COMPUTE FILE PACKAGES

BACKGROUND

A serverless compute service is a service that can be instantiated and run in a serverless compute environment on demand (e.g., without provisioning or managing of servers). The serverless compute service can utilize a serverless compute file package, which can include one or more files, one or more binaries, one or more portions of code, and/or other data, within the serverless compute environment. The serverless compute file package can be used by more than one serverless compute service within the serverless compute environment.

SUMMARY

In some implementations, a system for providing a data structure that stores information associated with serverless compute file packages includes one or more memories; and one or more processors, communicatively coupled to the one or more memories, configured to: receive, from a device, a serverless compute file package; determine that the serverless compute file package is approved; cause, based on determining that the serverless compute package is approved, the serverless compute file package to be deployed in a serverless compute environment; process, based on determining that the serverless compute file package is approved, the serverless compute file package to determine information associated with the serverless compute file package; and cause the information associated with the serverless compute file package to be included in the data structure, wherein the information associated with the serverless compute file package indicates that the serverless compute file package is approved, and indicates at least one serverless compute service that is associated with the serverless compute file package and the serverless compute environment.

In some implementations, a non-transitory computer-readable medium storing a set of instructions includes one or more instructions that, when executed by one or more processors of a system for providing a data structure that stores information associated with serverless compute file packages, cause the system to: identify a serverless compute file package; determine that the serverless compute file package is approved; process, based on determining that the serverless compute file package is approved, the serverless compute file package to determine information associated with the serverless compute file package; and cause the information associated with the serverless compute file package to be included in the data structure, wherein the information associated with the serverless compute file package indicates that the serverless compute file package is approved, and indicates at least one serverless compute service that is associated with the serverless compute file package.

In some implementations, a method includes causing, by a system for providing a data structure that stores information associated with serverless compute file packages, a serverless compute file package to be included in a serverless compute environment; processing, by the system, the serverless compute file package to determine information associated with the serverless compute file package; and causing, by the system, the information associated with the serverless compute file package to be included in the data structure, wherein the information associated with the serverless compute file package indicates at least one serverless compute service that is associated with the serverless compute file package and the serverless compute environment.

BRIEF DESCRIPTION OF THE DRAWINGS

FIGS. 1A-1F are diagrams of an example associated with providing a data structure that stores information associated with serverless compute file packages, in accordance with some embodiments of the present disclosure.

FIG. 4 is a flowchart of an example process associated with providing a data structure that stores information associated with serverless compute file packages, in accordance with some embodiments of the present disclosure.

DETAILED DESCRIPTION

Figure 1B:
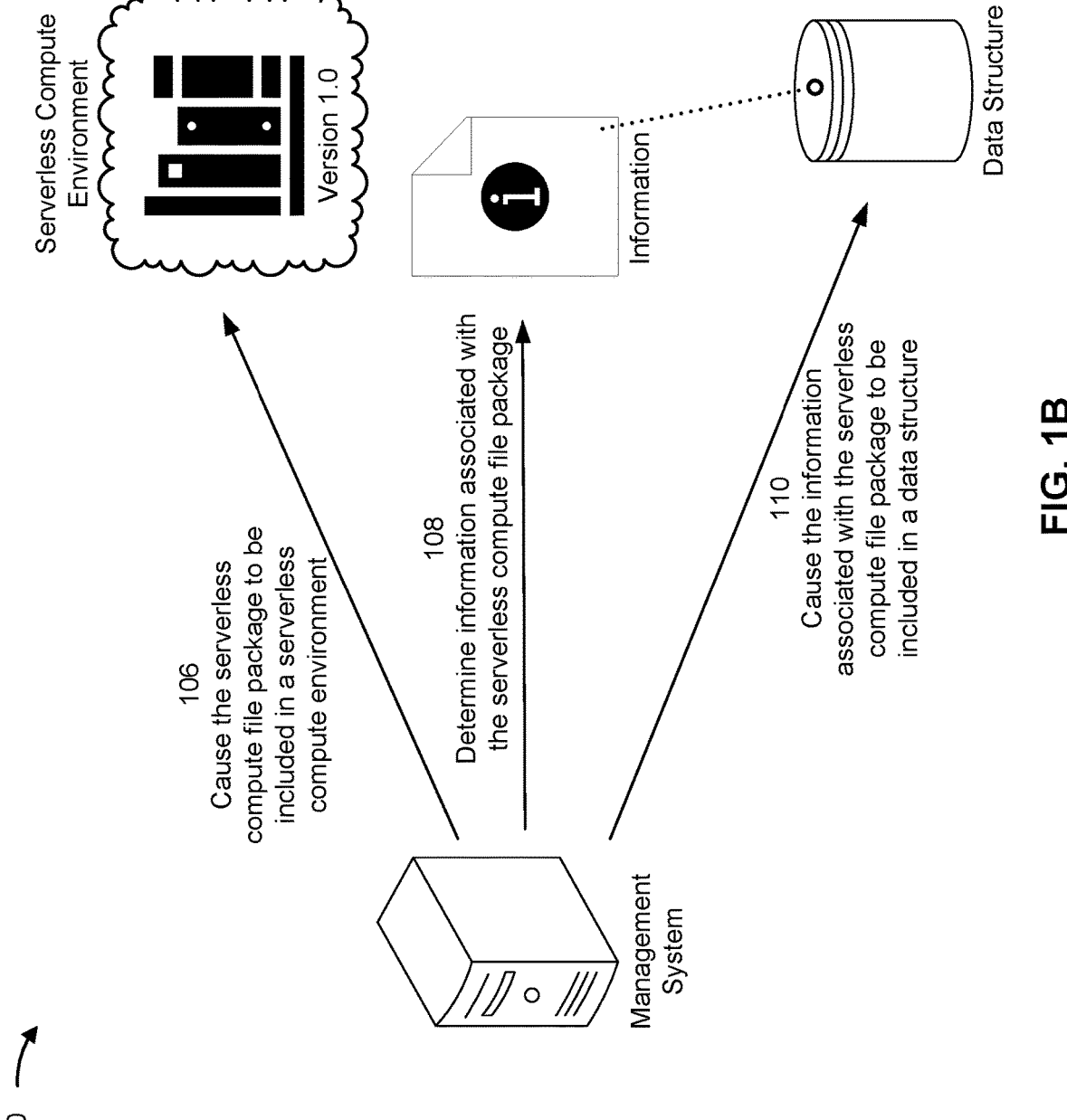

The following detailed description of example implementations refers to the accompanying drawings. The same reference numbers in different drawings may identify the same or similar elements.

In many cases, multiple serverless compute file packages can be deployed in a serverless compute environment. However, there is not a practical way to determine whether a serverless compute file package is deployed to the serverless compute environment. That is, in many cases, the serverless compute environment does not support tracking of which serverless compute file packages are deployed in the serverless compute environment. Further, other information about the serverless compute file packages is not tracked, such as which (if any) serverless compute services utilize the serverless compute file packages in the serverless compute environment. Consequently, a developer of a serverless compute service wastes computing resources (e.g., processing resources, memory resources, communication resources, and/or power resources, among other examples) of a device to develop a serverless compute service that improperly relies on an unavailable serverless compute file package (which renders the serverless compute service unusable within the serverless compute environment). Additional computing resources are therefore also used to address this improper reliance (e.g., to update the serverless compute service to include a functionality of the unavailable serverless compute file package). Accordingly, a need exists for a developer, when developing the serverless compute service, to determine whether a particular serverless compute file package is available for use within the serverless compute environment, and which serverless compute file packages are available within the serverless compute environment.

Some implementations described herein include a system for providing a data structure (e.g., a catalog, a database, or another type of data structure) that stores information associated with serverless compute file packages. The system receives a serverless compute file package and causes the serverless compute file package to be included in a server-less compute environment (e.g., to be deployed in the serverless compute environment). Additionally, the system determines information associated with the serverless compute file package (e.g., metadata of the serverless compute file package). The information may indicate, for example, that the serverless compute file package is approved (e.g., the serverless compute file package has been determined to have a low security vulnerability risk), which allows the serverless compute file package to deployed to the serverless compute environment, and may indicate at least one serverless compute service that is associated with the serverless compute file package (e.g., at least one serverless compute service that utilizes the serverless compute file package in the serverless compute environment). The system then may cause the information associated with the serverless compute file package to be included in the data structure.

In this way, the system enables the information associated with the serverless compute file package to be accessible to other devices. For example, a device (e.g., that is used by a developer of a serverless compute service) may send a query to the system (e.g., related to whether the serverless compute file package is approved and/or deployed to the serverless compute environment), and the system may thereby search the data structure to provide, to the device, a response to the query. Accordingly, a serverless compute function developer is quickly and efficiently provided information that can be used to develop a serverless compute service with a reduced likelihood of relying on an unavailable serverless compute file package. This prevents wastage of computing resources (e.g., processing resources, memory resources, communication resources, and/or power resources, among other examples) that would otherwise be used to develop a server-less compute function that improperly relies on an unavail-able serverless compute file package, and to address issues resulting from the improper reliance. Further, this improves a likelihood that the serverless compute service executes properly when instantiated in the serverless compute environment.

Additionally, in some implementations, the system noti-fies devices associated with serverless compute services that utilize the serverless compute file package within the server-less compute environment when the serverless compute file package is determined to no longer be allowed (e.g., due to an increased security vulnerability risk) or when an updated version of the serverless compute file package is deployed to the serverless compute environment. This allows a devel-oper of a serverless compute service to be timely notified of a change in circumstances that may affect a performance of the serverless compute service, which enables the developer to quickly address any issue resulting from the change in circumstances. This reduces a likelihood that the serverless compute service provides an unintended performance or functionality.

FIGS. 1A-1F are diagrams of an example 100 associated with providing a data structure that stores information associated with serverless compute file packages. As shown in FIGS. 1A-1F, example 100 includes a device and a management system. These devices are described in more detail in connection with FIGS. 2 and 3.

As shown in FIG. 1A, and by reference number 102, the device may send a serverless compute file package to the management system. For example, the device may send the serverless compute file package to the management system via a communication link between the device and the management system. Accordingly, the management system may obtain the serverless compute file package from the device (e.g., via the communication link).

The serverless compute file package may include, for example, one or more files, one or more binaries, one or more portions of code, and/or other data that can be utilized by a serverless compute service (e.g., when the serverless compute service is executed) in a serverless compute envi-ronment (e.g., a cloud compute environment). As an example, a serverless compute file package may be an Amazon Web Services (AWS) Lambda layer. A serverless compute service may include a portion of code that can be invoked and executed, in the serverless compute environ-ment, in response to an event. As an example, a serverless compute service may be an AWS Lambda function. The serverless compute environment may be a cloud compute environment, where computing resources (e.g., processing resources, memory resources, communication resources, and/or power resources, among other examples) are allo-cated dynamically (e.g., by a cloud compute environment provider). As an example, a serverless compute environment may be provided in AWS Lambda.

In some implementations, the serverless compute file package may be a particular version of the serverless com-pute file package. For example, as shown in FIG. 1A, the serverless compute file package is a "version 1.0" of the serverless compute file package.

As shown by reference number 104, the management system may determine whether the serverless compute file package is approved (e.g., to be deployed to the serverless compute environment). That is, the management system may determine whether the serverless compute file package has a suitable risk profile, such that the serverless compute file package may be included in the serverless compute environment (e.g., with minimal risk that the serverless compute file package jeopardizes an integrity of the server-less compute environment). For example, the management system may process (e.g., using a security scanning tech-nique) the serverless compute file package to determine whether the serverless compute file package is approved (e.g., whether the serverless compute file package is secure, or has a sufficiently low security vulnerability risk). As another example, the management system may obtain (e.g., receive from the device that sent the serverless compute file package to the management system, or another device) information indicating that the serverless compute file pack-age is approved (e.g., as part of a message or notification).

When the management system determines that the server-less compute file package is approved, the management system may perform one or more of the operations described herein in relation to FIGS. 1B-1F. Alternatively, when the management system determines that the serverless compute file package is not approved, the management system may not perform (or may prevent itself from performing) any of the operations described herein in relation to FIGS. 1B-1F.

As shown in FIG. 1B, and by reference number 106, the management system may cause the serverless compute file package to be included in the serverless compute environ-ment (e.g., based on determining that the serverless compute file package is approved). That is, the management system may cause the serverless compute file package to be deployed in the serverless compute environment (e.g., such that any serverless compute service that is included in the serverless compute environment may use the serverless compute file package).

As shown by reference number 108, the management system may determine information associated with the serverless compute file package (e.g., based on determining that the serverless compute file package is approved). For example, the management system may process (e.g., using one or more processing and/or analysis techniques) the serverless compute file package to determine the information associated with the serverless compute file package.

The information associated with the serverless compute file package may indicate, for example, that the serverless compute file package is approved, and/or may indicate at least one serverless compute service that is associated with the serverless compute file package and the serverless compute environment (e.g., at least one serverless compute service that utilizes the serverless compute file package and that is included in the serverless compute environment). Additionally, or alternatively, the information associated with the serverless compute file package may indicate a time that the management system received the serverless compute file package (e.g., from the device, as described herein in relation to FIG. 1A and reference number 102), a time that the system determined that the serverless compute file package is approved (e.g., as described herein in relation to FIG. 1A and reference number 104), identification information associated with the serverless compute file package (e.g., that includes an identifier, such as an Amazon Resource Name (ARN) or another type of identifier), version information associated with the serverless compute file package (e.g., that indicates a version of the serverless compute file package, such as "version 1.0" shown in FIG. 1B), keyword information associated with the serverless compute file package (e.g., that indicates one or more keywords that are associated with a use, functionality, and/or result of the serverless compute file package), creation information associated with the serverless compute file package (e.g., that indicates when the serverless compute file package was created, a developer or developer team of the serverless compute file package, an organization associated with creation of the serverless compute file package, and/or other similar information), management information associated with the serverless compute file package (e.g., that indicates a manager or management team of the serverless compute file package, an organization associated with managing the serverless compute file package, and/or other similar information), runtime information associated with the serverless compute file package (e.g., that indicates types of runtime environments, such as the serverless compute environment, in which the serverless compute file package may be deployed and/or used), and/or platform information associated with the serverless compute file package (e.g., that indicates a type of system architecture for which the serverless compute file package is built), among other examples. The information associated with the serverless compute file package may also be referred to as metadata of the serverless compute file package.

As shown by reference number 110, the management system may cause the information associated with the serverless compute file package to be included in a data structure (e.g., a catalog, a database, a table, a file, or another type of data structure). For example, the management system may communicate with the data structure to cause the data structure to save the information associated with the serverless compute file package (e.g., cause the data structure to include an entry that includes the information associated with the serverless compute file package). The data structure may be included in, and/or accessible to, the management system.

Figure 1C:
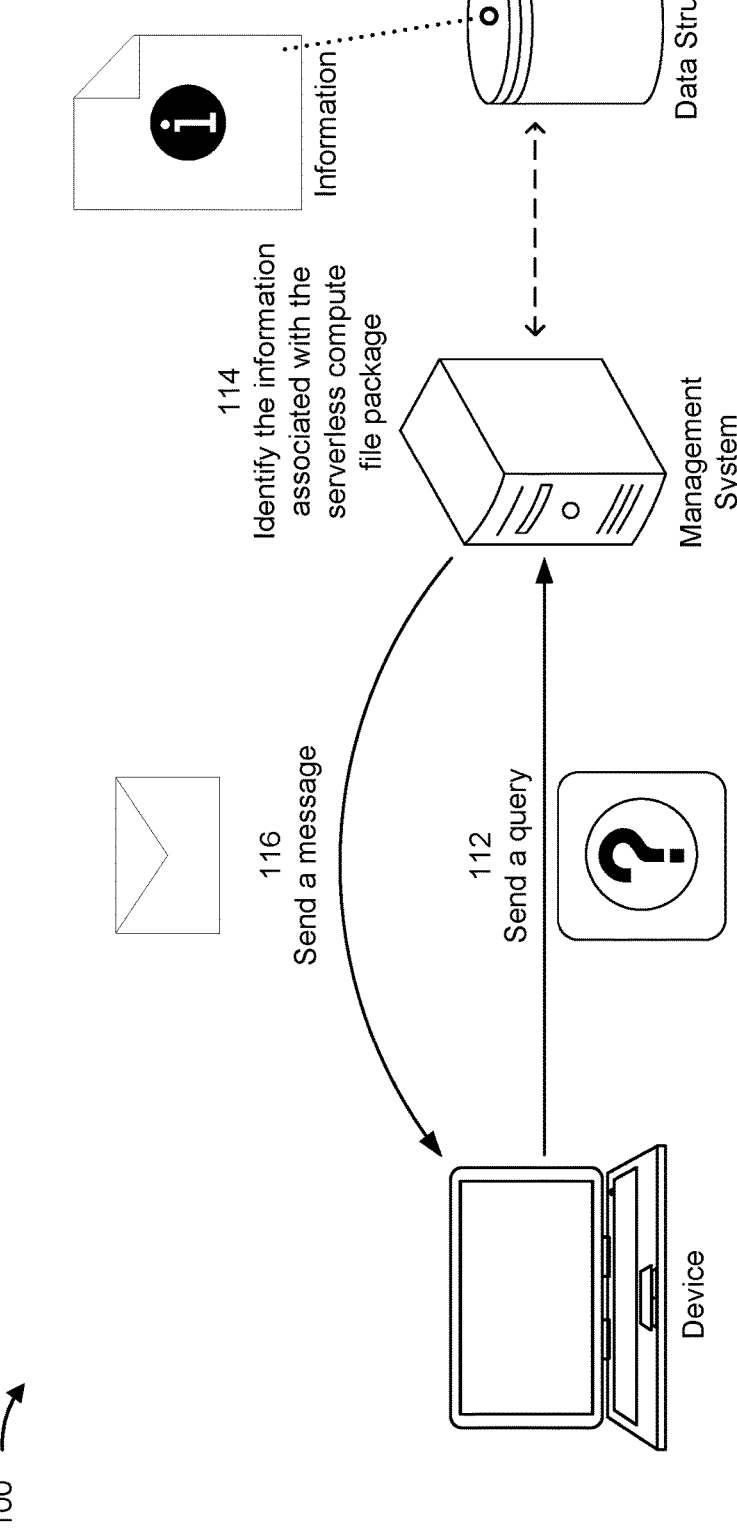

As shown in FIG. 1C, and by reference number 112, the device (or another device) may send a query to the management system. For example, the device may send the query to the management system via the communication link between the device and the management system. Accordingly, the management system may obtain the query from the device (e.g., via the communication link). The query may be, for example, related to whether the serverless compute file package is approved, whether the serverless compute file package is included in the serverless compute environment, or other information related to the serverless compute file package.

As shown by reference number 114, the management system may identify the information associated with the serverless compute file package (e.g., based on the query). For example, the management system may search, based on the query, the data structure to identify the information associated with the serverless compute file package. That is, the management system may search the data structure to identify the entry that includes the information associated with the serverless compute file package, and may process (e.g., parse and/or read) the entry to identify the information associated with the serverless compute file package.

As shown by reference number 116, the management system may send (e.g., based on the information associated with the serverless compute file package) a message to the device (e.g., the device that sent the query to the management system). For example, the management system may send the message to the device via the communication link between the device and the management system. Accordingly, the device may obtain the message from the management system (e.g., via the communication link). The message may include at least a portion of the information associated with the serverless compute file package. As an example, the message may indicate whether the serverless compute file package is approved and/or whether the serverless compute file package is included in the serverless compute environment.

Figure 1D:
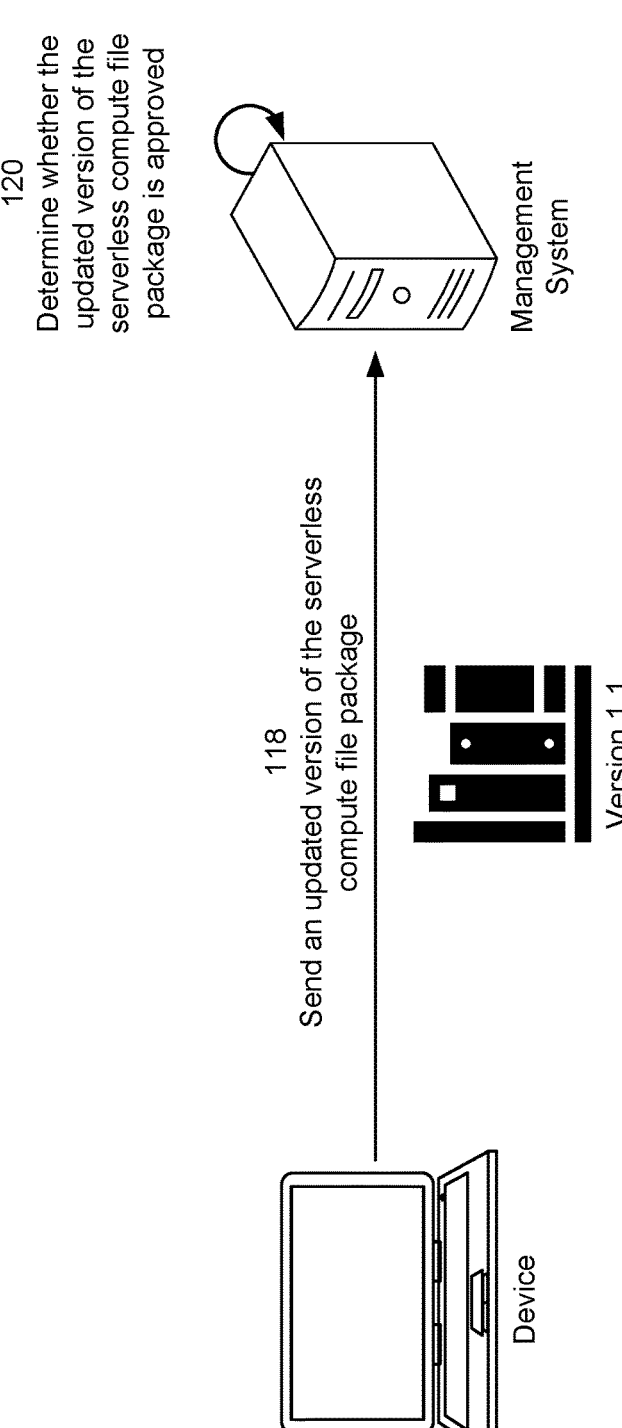

As shown in FIG. 1D, and by reference number 118, the device (or another device) may send an updated version of the serverless compute file package to the management system. For example, the device may send the updated version of the serverless compute file package to the management system via the communication link between the device and the management system. Accordingly, the management system may obtain the updated version of the serverless compute file package from the device (e.g., via the communication link). In some implementations, the updated version of the serverless compute file package may be a different version (e.g., a newer version) of the serverless compute file package. For example, as shown in FIG. 1D, the updated version of the serverless compute file package is a "version 1.1" of the serverless compute file package.

As shown by reference number 120, the management system may determine whether the updated version of the serverless compute file package is approved (e.g., to be deployed to the serverless compute environment). That is, the management system may determine whether the updated version of the serverless compute file package has a suitable risk profile such that the updated version of the serverless compute file package may be included in the serverless compute environment (e.g., with minimal risk that the updated version of the serverless compute file package jeopardizes an integrity of the serverless compute environment). For example, the management system may process (e.g., using a security scanning technique) the updated version of the serverless compute file package to determine whether the updated version of the serverless compute file package is approved (e.g., whether the updated version of the serverless compute file package is secure, or has a sufficiently low security vulnerability risk). As another example, the management system may obtain (e.g., receive from the device that sent the updated version of the serverless compute file package to the management system, or another device) information indicating that the updated version of the serverless compute file package is approved (e.g., as part of a message or notification).

In some implementations, the management system may determine whether the updated version of the serverless compute file package is different than the serverless compute file package (e.g., based on determining that the updated version of the serverless compute file package is approved). For example, the management system may search the data structure (e.g., based on identification information associated with the updated version of the serverless compute file package) to identify the information associated with the serverless compute file package. The management system may thereby compare the version information associated with the serverless compute file package (e.g., that is included in the information associated with the serverless compute file package) and version information associated with the updated version of the serverless compute file package to determine whether the updated version of the serverless compute file package is different than the serverless compute file package. When the management system determines that the updated version of the serverless compute file package is different than the serverless compute file package (e.g., "version 1.1" is different than "version 1.0"), the management system may perform one or more of the operations described herein in relation to FIG. 1E. Alternatively, when the management system determines that the updated version of the serverless compute file package is not different than the serverless compute file package (e.g., the updated version of the serverless compute file package is a copy of the serverless compute file package), the management system may not perform (or may prevent itself from performing) any of the operations described herein in relation to FIG. 1E.

Figure 1E:
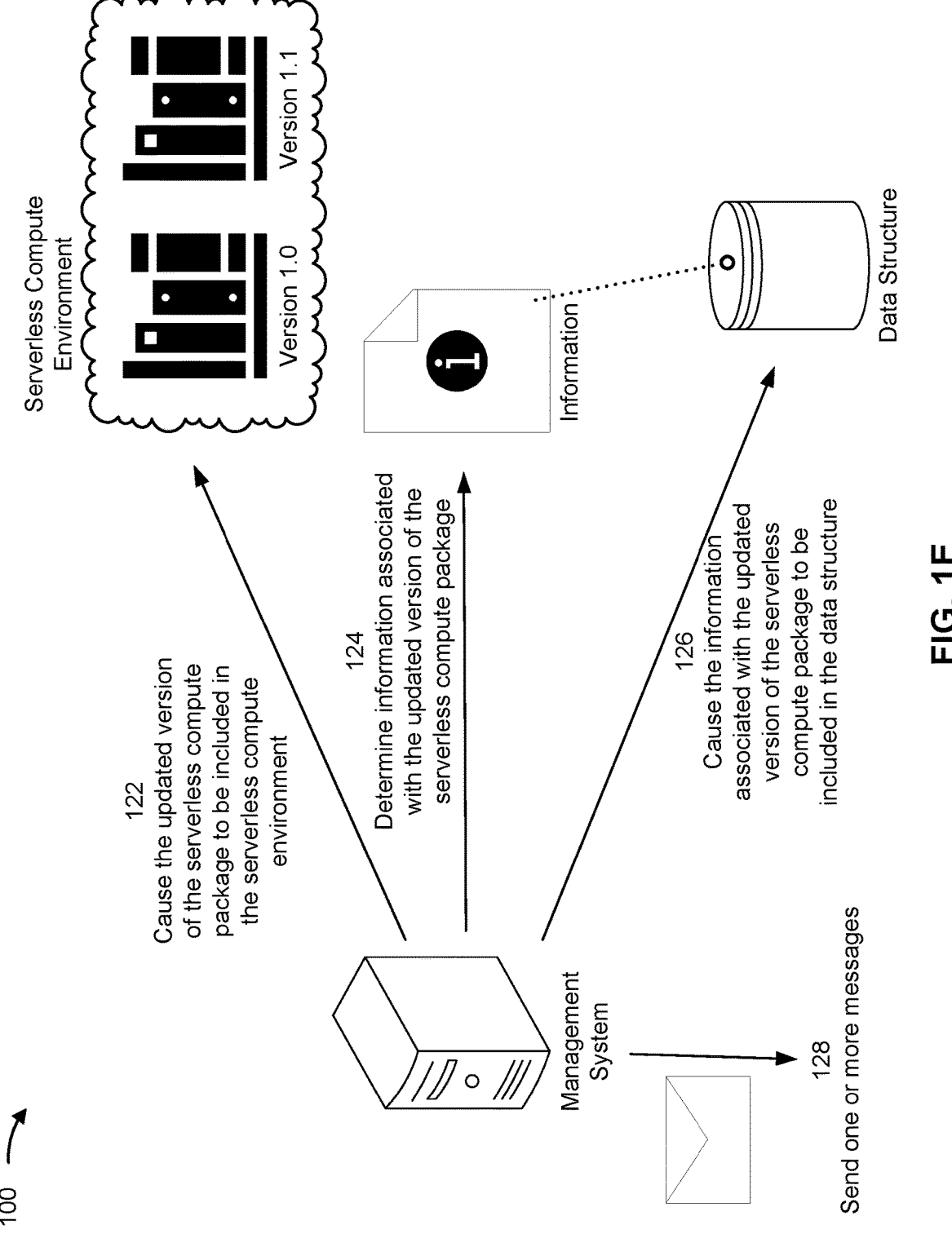

As shown in FIG. 1E, and by reference number 122, the management system may cause the updated version of the serverless compute file package to be included in the serverless compute environment (e.g., based on determining that the updated serverless compute file package is approved and/or that the updated serverless compute file package is a different version of the serverless compute file package). That is, the management system may cause the updated serverless compute file package to be deployed in the serverless compute environment (e.g., such that any serverless compute service that is included in the serverless compute environment may use the updated serverless compute file package).

As shown by reference number 124, the management system may determine information associated with the updated version of the serverless compute file package (e.g., based on determining that the updated serverless compute file package is approved and/or that the updated serverless compute file package is a different version of the serverless compute file package). For example, the management system may process (e.g., using one or more processing and/or analysis techniques) the serverless compute file package to determine the information associated with the updated version of the serverless compute file package. The information associated with the updated version of the serverless compute file package may include information that is similar to information included in the information associated with the serverless compute file package (e.g., as described herein in relation to FIG. 1B and reference number 108). For example, the information associated with the updated version of the serverless compute file package may indicate, for example, that the updated version of the serverless compute file package is approved, may indicate at least one serverless compute service that is associated with the updated version of the serverless compute file package and the serverless compute environment (e.g., at least one serverless compute service that utilizes the updated version of the serverless compute file package and that is included in the serverless compute environment), and/or may indicate other information. The information associated with the updated version of the serverless compute file package may also be referred to as metadata of the updated version of the serverless compute file package.

As shown by reference number 126, the management system may cause the information associated with the updated version of the serverless compute file package to be included in the data structure. For example, the management system may communicate with the data structure to cause the data structure to save the information associated with the updated version of the serverless compute file package (e.g., cause the data structure to include an entry that includes the information associated with the updated version of the serverless compute file package).

In some implementations, the management system may identify at least one serverless compute service that is associated with the serverless compute file package and the serverless compute environment (e.g., based on the management system performing one or more of the operations described herein in relation to FIG. 1E). That is, the management system may identify at least one serverless compute service that utilizes the serverless compute file package within the serverless compute environment. For example, the management system may search the data structure (e.g., based on at least some of the information associated with the updated version of the serverless compute file package, such as the identification information associated with the updated version of the serverless compute file package) to identify the information associated with the serverless compute file package. The management system may thereby process (e.g., parse and/or read) the information associated with the serverless compute file package to identify the at least one serverless compute service that is associated with the serverless compute file package.

Accordingly, as shown by reference number 128, the management system may send, to at least one device associated with the at least one serverless compute service (e.g., at least one device associated with a developer or development team, or a manager or management team, of the at least one serverless compute service), one or more messages. Each message may indicate that the updated version of the serverless compute file package is approved and/or can be used in association with the at least one serverless compute service. In this way, the management system facilitates notification of stakeholders in relevant serverless compute services that an updated version of the serverless compute file package is approved and/or available for use.

Figure 1F:
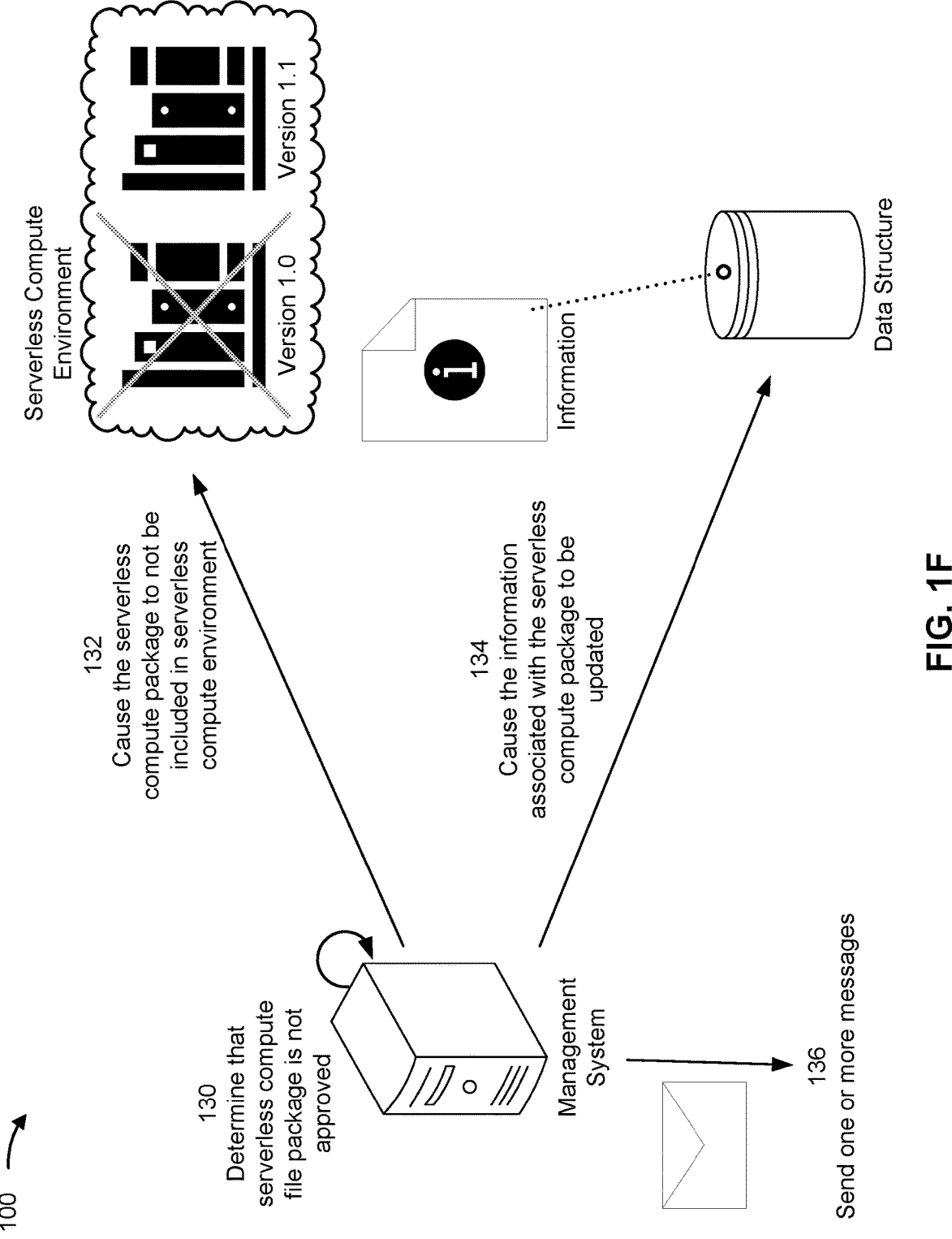

As shown in FIG. 1F, and by reference number 130, the management system may determine (e.g., after causing the serverless compute file package to be included in the serverless compute environment and/or causing the information associated with the serverless compute file package to be included in the data structure, as described herein in relation to FIG. 1B) that the serverless compute file package is not approved (e.g., is to no longer be deployed to the serverless compute environment). That is, the management system may determine that the serverless compute file package no longer has a suitable risk profile, such that the serverless compute file package cannot continue to be included in the serverless compute environment (e.g., because the serverless compute file package may jeopardize an integrity of the serverless compute environment). For example, the management system may process (e.g., using a security scanning technique) the serverless compute file package to determine that the serverless compute file package is not approved (e.g., that the serverless compute file package is not secure, or has a sufficiently high security vulnerability risk). As another example, the management system may obtain (e.g., receive from the device that sent the serverless compute file package to the management system, or another device) information indicating that the serverless compute file package is not approved (e.g., as part of a message or notification).

As shown by reference number 132, the management system may cause the serverless compute file package to not be included in the serverless compute environment (e.g., based on determining that the serverless compute file package is not approved). That is, the management system may cause the serverless compute file package to no longer be deployed in the serverless compute environment (e.g., such that any serverless compute service that is included in the serverless compute environment may not use the serverless compute file package).

As shown by reference number 134, the management system may cause the information associated with the serverless compute file package to be updated (e.g., in the data structure). For example, the management system may communicate with the data structure to cause the data structure to update the information associated with the serverless compute file package (e.g., cause the data structure to update the entry that includes the information associated with the serverless compute file package). The information associated with the serverless compute file package may be updated, for example, to indicate that the serverless compute file package is not approved.

In some implementations, the management system may identify at least one serverless compute service that is associated with the serverless compute file package and the serverless compute environment (e.g., based on the management system performing one or more of the operations described above in relation to FIG. 1F). That is, the management system may identify at least one serverless compute service that utilizes the serverless compute file package within the serverless compute environment. For example, the management system may search the data structure to identify the information associated with the serverless compute file package (e.g., after, and/or in association with, causing the information associated with the serverless compute file package to be updated in the data structure). The management system may thereby process (e.g., parse and/or read) the information associated with the serverless compute file package to identify the at least one serverless compute service that is associated with the serverless compute file package.

Accordingly, as shown by reference number 136, the management system may send, to at least one device associated with the at least one serverless compute service (e.g., at least one device associated with a developer or development team, or a manager or management team, of the at least one serverless compute service), one or more messages. Each message may indicate that the serverless compute file package is not approved and/or cannot be used in association with the at least one serverless compute service. In this way, the management system facilitates notification of stakehold-ers in relevant serverless compute services that the serverless compute file package is not approved and/or not available for use.

As indicated above, FIGS. 1A-1F are provided as an example. Other examples may differ from what is described with regard to FIGS. 1A-1F.

Figure 2:
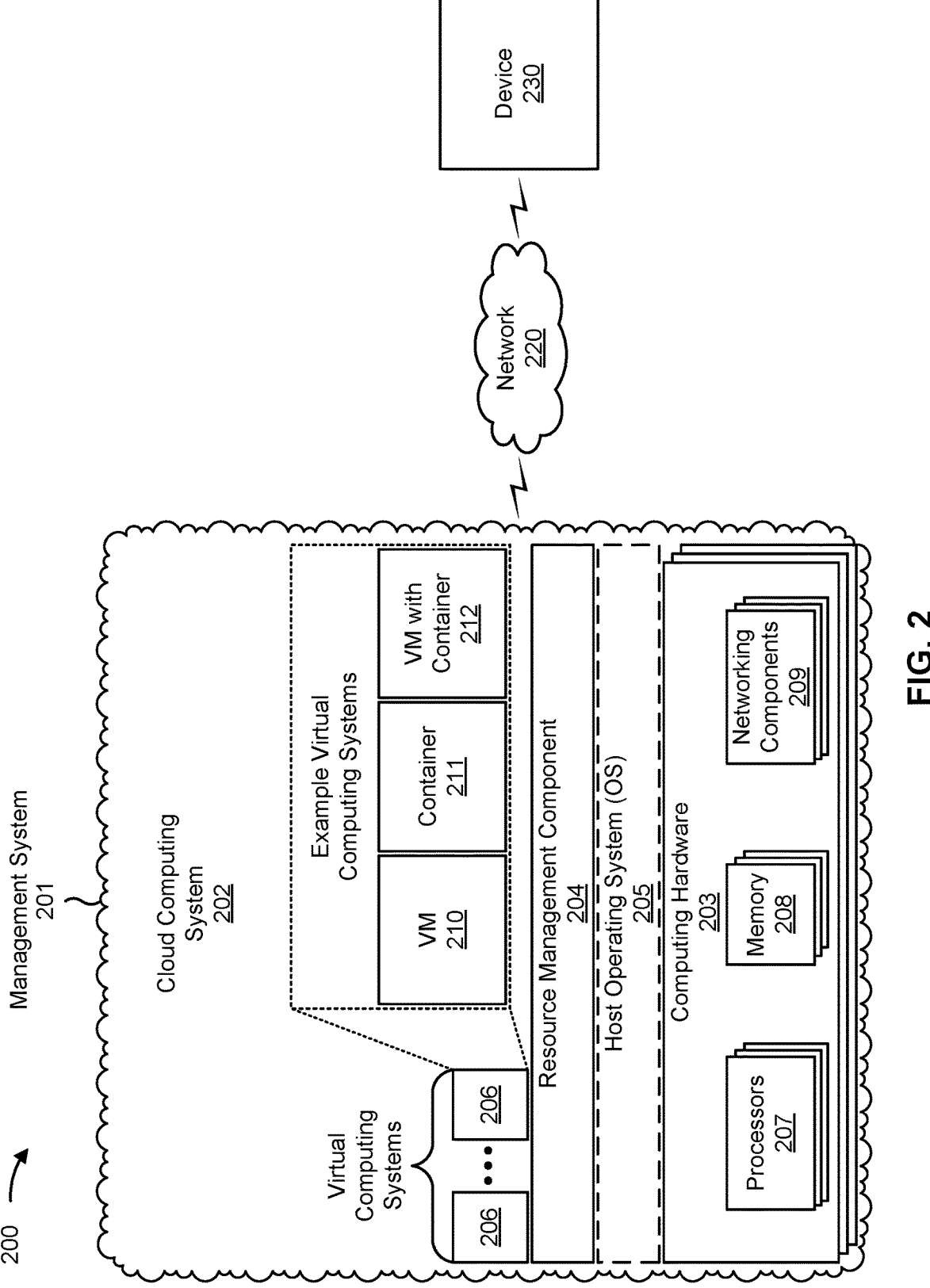
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a management system 201, which may include one or more elements of and/or may execute within a cloud computing system 202. The cloud computing system 202 may include one or more elements 203-212, as described in more detail below. As further shown in FIG. 2, environment 200 may include a network 220, and/or a device 230. Devices and/or elements of environment 200 may interconnect via wired connections and/or wireless connections.

The cloud computing system 202 may include computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 may include hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 may include a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 may include a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205. The virtual computing system 206 may support a serverless compute environment (e.g., that can be provided on demand).

Although the management system 201 may include one or more elements 203-212 of the cloud computing system 202, may execute within the cloud computing system 202, and/or may be hosted within the cloud computing system 202, in some implementations, the management system 201 may not be cloud-based (e.g., may be implemented outside of a cloud computing system) or may be partially cloud-based. For example, the management system 201 may include one or more devices that are not part of the cloud computing system 202, such as device 300 of FIG. 3, which may include a standalone server or another type of computing device. The management system 201 may perform one or more operations and/or processes described in more detail elsewhere herein.

The network 220 may include one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The device 230 may include one or more devices capable of receiving, generating, storing, processing, and/or providing information associated with serverless compute file packages, as described elsewhere herein. The device 230 may include a communication device and/or a computing device. For example, the device 230 may include a wireless communication device, a mobile phone, a user equipment, a laptop computer, a tablet computer, a desktop computer, or a similar type of device. As another example, the device 230 may include a server, such as an application server, a client server, a web server, a database server, a host server, a proxy server, a virtual server (e.g., executing on computing hardware), or a server in a cloud computing system. In some implementations, the device 230 may include computing hardware used in a cloud computing system.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
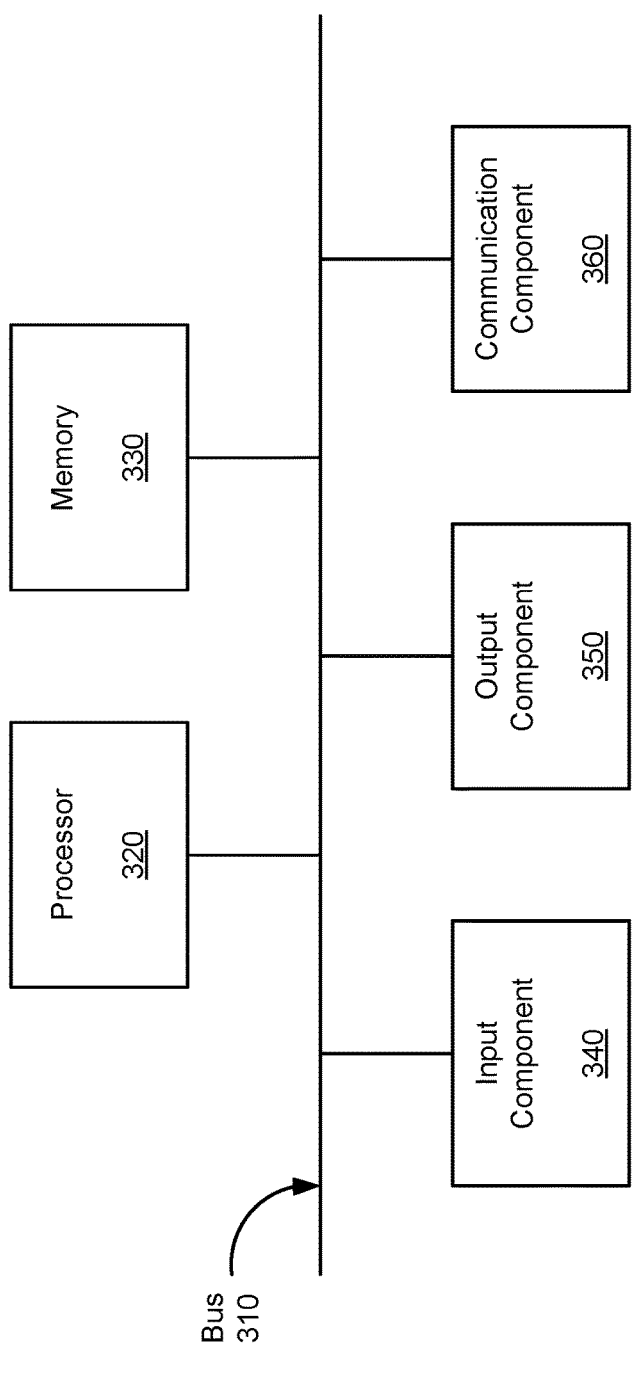
FIG. 3 is a diagram of example components of a device associated with providing a data structure that stores information associated with serverless compute file packages, in accordance with some embodiments of the present disclosure.

FIG. 3 is a diagram of example components of a device 300 associated with providing a data structure that stores information associated with serverless compute file packages. The device 300 may correspond to the management system 201, the computing hardware 203, and/or the device 230. In some implementations, the management system 201, the computing hardware 203, and/or the device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with providing a data structure that stores information associated with serverless compute file packages. In some implementations, one or more process blocks of FIG. 4 may be performed by the management system 201. In some implementations, one or more process blocks of FIG. 4 may be performed by another device or a group of devices separate from or including the management system 201, such as the device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a serverless compute file package (block 410). For example, the management system 201 (e.g., using processor 320, memory 330, input component 340, and/or communication component 360) may receive, from a device, a serverless compute file package, as described above in connection with reference number 102 of FIG. 1A. As an example, a device may send the serverless compute file package to the management system 201 via a communication link between the device and the management system 201.

As further shown in FIG. 4, process 400 may include determining that the serverless compute file package is approved (block 420). For example, the management system 201 (e.g., using processor 320 and/or memory 330) may determine that the serverless compute file package is approved, as described above in connection with reference number 104 of FIG. 1A. As an example, the management system 201 may process (e.g., using a security scanning technique) the serverless compute file package to determine that the serverless compute file package is approved.

As further shown in FIG. 4, process 400 may include causing the serverless compute file package to be included in a serverless compute environment (block 430). For example, the management system 201 (e.g., using processor 320 and/or memory 330) may cause, based on determining that the serverless compute package is approved, the serverless compute file package to be included in a serverless compute environment, as described above in connection with reference number 106 of FIG. 1B. As an example, the management system 201 may cause the serverless compute file package to be deployed in the serverless compute environment.

As further shown in FIG. 4, process 400 may include processing the serverless compute file package to determine information associated with the serverless compute file package (block 440). For example, the management system 201 (e.g., using processor 320 and/or memory 330) may process, based on determining that the serverless compute file package is approved, the serverless compute file package to determine information associated with the serverless compute file package, as described above in connection with reference number 108 of FIG. 1B. As an example, the management system 201 may process (e.g., using one or more processing and/or analysis techniques) the serverless compute file package to determine the information associated with the serverless compute file package.

As further shown in FIG. 4, process 400 may include causing the information associated with the serverless compute file package to be included in a data structure (block 450). For example, the management system 201 (e.g., using processor 320 and/or memory 330) may cause the information associated with the serverless compute file package to be included in a data structure, as described above in connection with reference number 110 of FIG. 1B. As an example, the management system 201 may communicate with the data structure to cause the data structure to save the information associated with the serverless compute file package. In some implementations, the information associated with the serverless compute file package indicates that the serverless compute file package is approved, and indicates at least one serverless compute service that is associated with the serverless compute file package and the serverless compute environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing a data structure that stores information associated with serverless compute file packages, the system comprising:
   one or more memories; and
   one or more processors, communicatively coupled to the one or more memories, configured to:

receive, from a device, a serverless compute file package;
   determine that the serverless compute file package is approved;
   cause, based on determining that the serverless compute package is approved, the serverless compute file package to be deployed in a serverless compute environment;
   process, based on determining that the serverless compute file package is approved, the serverless compute file package to determine information associated with the serverless compute file package; and
   cause the information associated with the serverless compute file package to be included in the data structure,
      wherein the information associated with the serverless compute file package indicates that the serverless compute file package is approved, and indicates at least one serverless compute service that is associated with the serverless compute file package and the serverless compute environment.

2. The system of claim 1,
wherein the information associated with the serverless compute file package further indicates at least one of:
   a time that the system received the serverless compute file package,
   a time that the system determined that the serverless compute file package is approved,
   identification information associated with the serverless compute file package,
   version information associated with the serverless compute file package,
   keyword information associated with the serverless compute file package,
   creation information associated with the serverless compute file package,
   management information associated with the serverless compute file package,
   runtime information associated with the serverless compute file package, or
   platform information associated with the serverless compute file package.

3. The system of claim 1,
wherein the one or more processors are further configured to:
   determine, after causing the information associated with the serverless compute file package to be included in the data structure, that the serverless compute file package is not approved;
   search, based on determining that the serverless compute file package is not approved, the data structure to identify the at least one serverless compute service; and
   send, to at least one device associated with the at least one serverless compute service, one or more messages that indicate that the serverless compute file package is not approved.

4. The system of claim 1,
wherein the one or more processors are further configured to:
   determine, after causing the information associated with the serverless compute file package to be included in the data structure, that the serverless compute file package is not approved; and
   cause, based on determining that the serverless compute file package is not approved, the information associated with the serverless compute file package that is included in the data structure to indicate that the serverless compute file package is not approved.

5. The system of claim 4,
wherein the one or more processors, to determine that the serverless compute file package is not approved, are configured to:
process, using a security scanning technique, the serverless compute file package to determine that the serverless compute file package is not approved.

6. The system of claim 4,
wherein the one or more processors, to determine that the serverless compute file package is not approved, are configured to:
receive, from a different device, information indicating that the serverless compute file package is not approved.

7. The system of claim 1,
wherein the one or more processors are further configured to:
receive, from a different device, a query related to whether the serverless compute file package is approved;
search, based on the query, the data structure to identify the information associated with the serverless compute file package; and
send, to the different device and based on the information associated with the serverless compute file package, a message that indicates whether the serverless compute file package is approved.

8. The system of claim 1,
wherein the one or more processors are further configured to:
receive, from the device or a different device, an updated version of the serverless compute file package;
determine that the updated version of the serverless compute file package is approved;
search, based on determining that the updated version of the serverless compute file package is approved, the data structure to determine that the updated version of the serverless compute file package is a different version of the serverless compute file package;
cause, based on determining that the updated version of the serverless compute file package is a different version of the serverless compute file package, the updated version of the serverless compute file package to be included in the serverless compute environment;
process, based on determining that the updated version of the serverless compute file package is a different version of the serverless compute file package, the updated version of the serverless compute file package to determine information associated with the updated version of the serverless compute file package; and
cause the information associated with the updated version of the serverless compute file package to be included in the data structure,
wherein the information associated with the updated version of the serverless compute file package indicates that the updated version of the serverless compute file package is determined to be approved, and indicates at least one serverless compute service that is associated with the updated version of the serverless compute file package and the serverless compute environment.

9. The system of claim 8,
wherein the one or more processors are further configured to:
search, based on determining that the updated version of the serverless compute file package is a different version of the serverless compute file package, the data structure to identify the at least one serverless compute service; and
send, to at least one device associated with the at least one serverless compute service, one or more messages that indicate that the updated version of the serverless compute file package is approved and can be used in association with the at least one serverless compute service.

10. A non-transitory computer-readable medium storing a set of instructions, the set of instructions comprising:
one or more instructions that, when executed by one or more processors of a system for providing a data structure that stores information associated with serverless compute file packages, cause the system to:
identify a serverless compute file package;
determine that the serverless compute file package is approved;
process, based on determining that the serverless compute file package is approved, the serverless compute file package to determine information associated with the serverless compute file package; and
cause the information associated with the serverless compute file package to be included in the data structure,
wherein the information associated with the serverless compute file package indicates that the serverless compute file package is approved, and indicates at least one serverless compute service that is associated with the serverless compute file package.

11. The non-transitory computer-readable medium of claim 10,
wherein the one or more instructions further cause the system to:
determine, after causing the information associated with the serverless compute file package to be included in the data structure, that the serverless compute file package is not approved;
identify, based on determining that the serverless compute file package is not approved and based on the data structure, the at least one serverless compute service; and
send, to at least one device associated with the at least one serverless compute service, one or more messages that indicate that the serverless compute file package is not approved.

12. The non-transitory computer-readable medium of claim 10,
wherein the one or more instructions further cause the system to:
determine, after causing the information associated with the serverless compute file package to be included in the data structure, that the serverless compute file package is not approved; and
cause, based on determining that the serverless compute file package is not approved, the information associated with the serverless compute file package that is included in the data structure to indicate that the serverless compute file package is not approved.

13. The non-transitory computer-readable medium of claim 10, wherein the one or more instructions, that cause the system to determine that the serverless compute file package is approved, cause the system to:

process the serverless compute file package to determine that the serverless compute file package is approved.

14. The non-transitory computer-readable medium of claim 10, wherein the one or more instructions, that cause the system to determine that the serverless compute file package is approved, cause the system to:

obtain information indicating that the serverless compute file package is not approved.

15. The non-transitory computer-readable medium of claim 10, wherein the one or more instructions further cause the system to:

receive, from a different device, a query related to whether the serverless compute file package is approved; and send, to the different device, and based on searching the data structure based on the query, a message that indicates whether the serverless compute file package is approved.

16. A method, comprising:

causing, by a system for providing a data structure that stores information associated with serverless compute file packages, a serverless compute file package to be included in a serverless compute environment based on determining that the serverless compute file package is approved;

processing, by the system, the serverless compute file package to determine information associated with the serverless compute file package; and causing, by the system, the information associated with the serverless compute file package to be included in the data structure, wherein the information associated with the serverless compute file package indicates that the serverless compute file package is approved, and indicates at least one serverless compute service that is associated with the serverless compute file package and the serverless compute environment.

17. The method of claim 16, further comprising:

determining, by the system, and before causing the serverless compute file package to be included in the serverless compute environment and before processing the serverless compute file package to determine the information associated with the serverless compute file package, a time that the system determined that the serverless compute file package is approved.

18. The method of claim 16, further comprising:

determining, after causing the information associated with the serverless compute file package to be included in the data structure, that the serverless compute file package is not approved;

identifying, based on determining that the serverless compute file package is not approved and by searching the data structure, the at least one serverless compute service; and sending, to at least one device associated with the at least one serverless compute service, one or more messages that indicate that the serverless compute file package is not approved.

19. The method of claim 16, further comprising:

determining, after causing the information associated with the serverless compute file package to be included in the data structure, that the serverless compute file package is not approved; and causing, based on determining that the serverless compute file package is not approved, at least one of:

the serverless compute file package to not be included in a serverless compute environment, or the data structure to indicate that the serverless compute file package is not approved.

20. The method of claim 16, further comprising:

receiving, from a device, a query related to the serverless compute file package;

searching, based on the query, the data structure to identify the information associated with the serverless compute file package; and sending, to the device and based on the information associated with the serverless compute file package, a message that indicates whether the serverless compute file package is approved.

* * * * *